(12) United States Patent
Rannoux et al.

(10) Patent No.: US 11,583,044 B2
(45) Date of Patent: Feb. 21, 2023

(54) EXTERNAL COMPONENT WITH DECORATION FOR WATCHES OR JEWELLERY AND METHOD FOR MANUFACTURING THE SAME

(71) Applicant: The Swatch Group Research and Development Ltd, Marin (CH)

(72) Inventors: Claire Rannoux, Morges (CH); Nicolas Francois, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 941 days.

(21) Appl. No.: 16/349,810

(22) PCT Filed: Aug. 9, 2017

(86) PCT No.: PCT/EP2017/070193
§ 371 (c)(1),
(2) Date: May 14, 2019

(87) PCT Pub. No.: WO2018/108336
PCT Pub. Date: Jun. 21, 2018

(65) Prior Publication Data
US 2019/0357639 A1 Nov. 28, 2019

(30) Foreign Application Priority Data
Dec. 16, 2016 (EP) .................................. 16204579

(51) Int. Cl.
*B29C 48/18* (2019.01)
*A44C 27/00* (2006.01)
(Continued)

(52) U.S. Cl.
CPC ............ *A44C 27/00* (2013.01); *A44C 5/0053* (2013.01); *A44C 27/007* (2013.01); *B29C 48/07* (2019.02);
(Continued)

(58) Field of Classification Search
CPC ...................................................... B29C 48/18
See application file for complete search history.

(56) References Cited

U.S. PATENT DOCUMENTS
5,413,822 A 5/1995 Rey

FOREIGN PATENT DOCUMENTS
CN 205492829 U 8/2016
DE 38 02 396 A1 8/1989
(Continued)

OTHER PUBLICATIONS

Machine translation of JP 2003-306802, retrieved from EPO database Apr. 28, 2021 (Year: 2021).*
(Continued)

*Primary Examiner* — Timothy Kennedy
(74) *Attorney, Agent, or Firm* — Oblon, McClelland, Maier & Neustadt, L.L.P.

(57) ABSTRACT

A method for manufacturing an external component for watches or jewellery, especially a bracelet, includes the steps of: providing a substrate including a first face opposite to a second face and co-extrusion coating the first face and the second face of the substrate respectively with a first and a second band of synthetic material. The first band forms on the first face a transparent or translucent layer so that all or part of the substrate remains visible.

14 Claims, 4 Drawing Sheets

(51) Int. Cl.

| | | |
|---|---|---|
| *B29C 48/35* | (2019.01) | |
| *B29C 48/07* | (2019.01) | |
| *B29C 48/30* | (2019.01) | |
| *A44C 5/00* | (2006.01) | |
| *B29C 48/21* | (2019.01) | |
| *B29C 48/49* | (2019.01) | |
| *B29L 7/00* | (2006.01) | |

(52) U.S. Cl.
CPC .............. *B29C 48/18* (2019.02); *B29C 48/21* (2019.02); *B29C 48/304* (2019.02); *B29C 48/35* (2019.02); *B29C 48/49* (2019.02); *B29L 2007/007* (2013.01)

(56) References Cited

FOREIGN PATENT DOCUMENTS

| DE | 195 13 647 A1 | 10/1995 |
|---|---|---|
| EP | 2 233 025 A2 | 9/2010 |
| FR | 1453496 | 6/1966 |
| GB | 634465 | 3/1950 |
| JP | 52-28359 U | 3/1977 |
| JP | 61-131916 U | 8/1986 |
| JP | 63-120911 U | 8/1988 |
| JP | 1-138732 U | 9/1989 |
| JP | 6-239004 A | 8/1994 |
| JP | 6-312434 A | 11/1994 |
| JP | 7-8308 A | 1/1995 |
| JP | 2002-263384 A | 9/2002 |
| JP | 2003-164307 A | 6/2003 |
| JP | 2003-306802 A | 10/2003 |

OTHER PUBLICATIONS

Machine translation of JP S52-28359, retrieved from EPO database Oct. 5, 2022 (Year: 2022).*

International Search Report dated Sep. 11, 2017 in PCT/EP2017/070193 filed on Aug. 9, 2017.

Combined Chinese Office Action and Search Report dated Dec. 18, 2020 in corresponding Chinese Patent Application No. 201780076835.7 (with English Translation and English Translation of Category of Cited Documents), 31 pages.

Japanese Office Action dated Jul. 28, 2020 in Patent Application No. 2019-528753 (with English translation), 11 pages.

* cited by examiner

Fig. 3
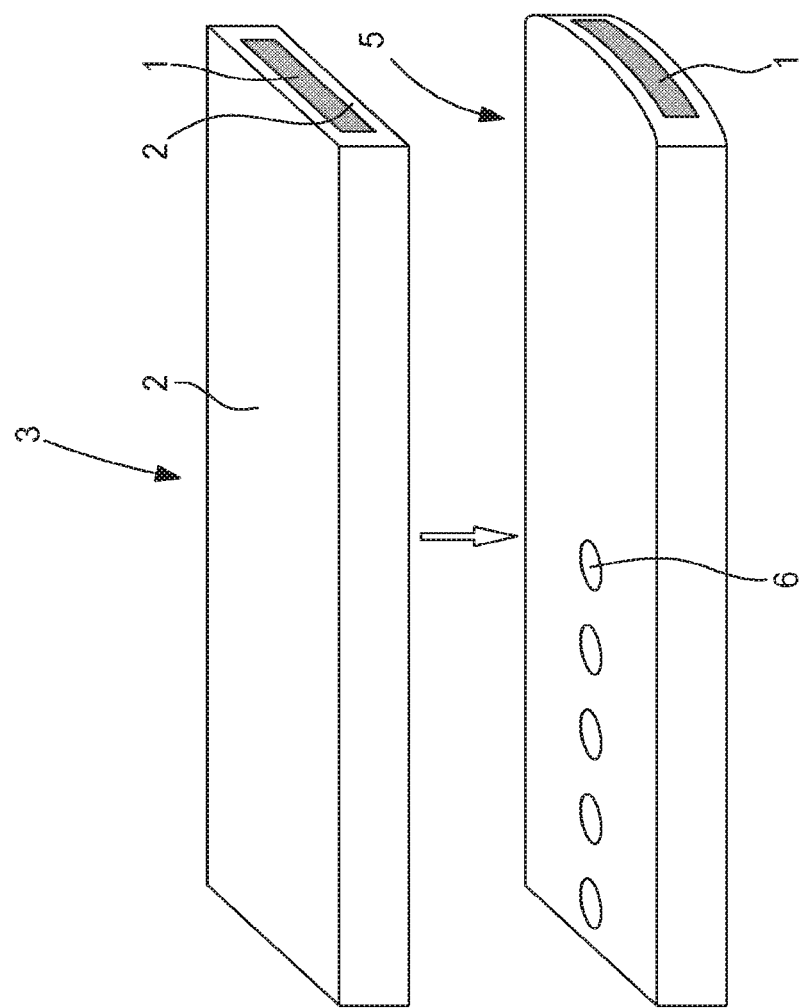
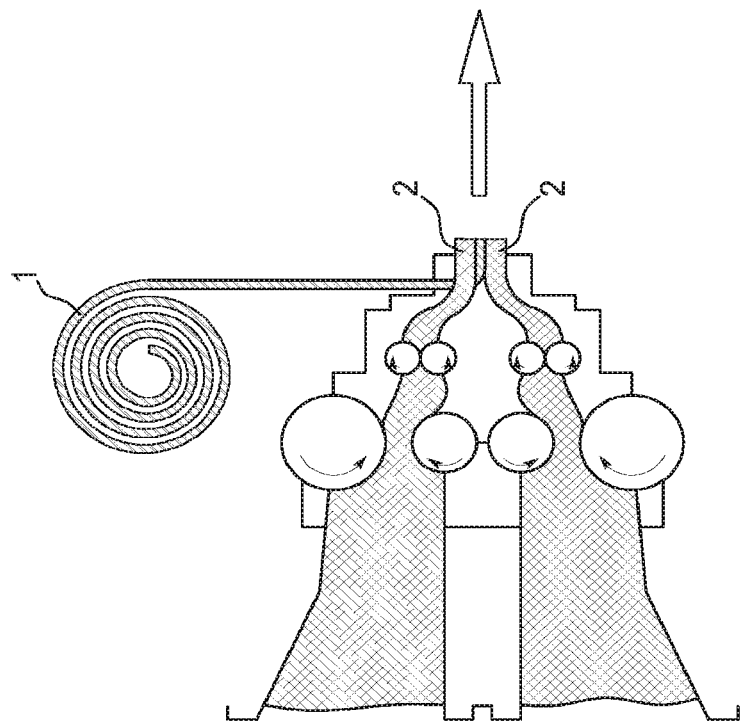

EXTERNAL COMPONENT WITH DECORATION FOR WATCHES OR JEWELLERY AND METHOD FOR MANUFACTURING THE SAME

SUBJECT OF THE INVENTION

The present invention relates to the field of horology and jewellery. More particularly, it relates to a method for coextrusion coating a substrate to make, amongst other things, bracelets or straps.

BACKGROUND OF THE INVENTION AND PRIOR ART

Plastic bracelets having different colours, decorations or incorporating particular visual effects are highly prized by clients. This type of bracelet can be manufactured by injection moulding, overmoulding or bi-injection moulding plastic materials in different colours. These are batch manufacturing processes with multiple steps, which makes them unsuitable for inexpensive industrial mass production.

In the past, it has been proposed to make bracelets by an extrusion process which is a less expensive process. The manufacture of bracelets by extrusion has generally been limited to the manufacture of bracelets of simple shape, in one colour and made of the same material, as described in FR Patent No. 2121864. Recently, it was proposed in EP Patent Application No. 16150493 to co-extrude materials of different colours or properties to form bracelets with more complex geometries and properties.

However, these methods cannot produce complex patterns which involve particular geometries and very high precision, as in the case of landscapes, figurines, messages, etc. It is also difficult to integrate materials other than plastic materials which could produce an original aesthetic effect.

In general, bracelets with complex patterns are made by digital printing on unicoloured substrates made by moulding. Digital printing provides access to a large variety of designs. However, the process has several drawbacks: the pattern is only on the surface and is therefore subject to mechanical wear. This means that, over time, the pattern fades. Wear is generally irregular, which very quickly leads to an unsatisfactory aesthetic appearance of the bracelet. The pattern is also susceptible to UV damage and to chemical damage. Bracelets manufactured by this type of process thus have patterns that change over time with the appearance of undesired and unattractive effects. FR Patent No. 2639870 overcomes this problem by proposing a bracelet formed with a thermoplastic body, a printed film and a transparent protective layer. However, the manufacturing method proposed in this document is an injection moulding process. This results in problems of positioning and holding the printed film in place inside the mould. Moreover, the process is long (printing and cutting the printed film, positioning the film inside the mould, moulding and forming the transparent protective layer) and requires several manual operations. This makes high production rates impossible.

Another drawback of surface printing the bracelet is the lack of adhesion of digital printing inks to silicone type plastic bracelets which have low surface energy. Moreover, changing the basic plastic formulation of the bracelet often involves readjusting the ink formulation.

SUMMARY OF THE INVENTION

It is an object of the present invention to manufacture external components and more particularly bracelets or straps having complex patterns using a simple and inexpensive method which can be compatible with high production rates. The present invention more precisely intends to integrate a decoration within the external component, without any problems as to positioning or ink adhesion in the case of a printed ink. The present invention also intends to develop a manufacturing method guaranteeing stability of the printed decoration over time.

To this end, the invention concerns a method for manufacturing an external component for watches or jewellery, especially bracelets, including the steps of:

providing a substrate having a first face opposite to a second face, co-extrusion coating the first face and the second face of said substrate respectively with a first and a second band of synthetic material; the first band forming a transparent or translucent layer on the first face so that all or part of the substrate remains visible.

According to an advantageous embodiment of the manufacturing method of the invention, a step of printing and/or etching a decoration on the first face of the substrate is provided before the step of co-extrusion coating the first and second faces of the substrate and preferably a plurality of distinct decorations are printed and/or etched one after the other on the first face of the substrate.

According to a preferred variant, a step of providing 2D or 3D files containing customized data relating to the printing or etching of each decoration is provided before the printing step.

Other specific embodiments are defined in the dependent claims.

BRIEF DESCRIPTION OF THE DRAWINGS

The features and advantages of the present invention will appear upon reading the following detailed description with reference to the following Figures.

FIG. 3 represents, according to the invention, a schematic view of the multi-layered extrudate produced by the co-extrusion die and of the same extrudate after cutting and stamping. According to this variant, the bracelet is co-extruded in the longitudinal direction of the bracelet.

DETAILED DESCRIPTION OF THE INVENTION

Figure 1:
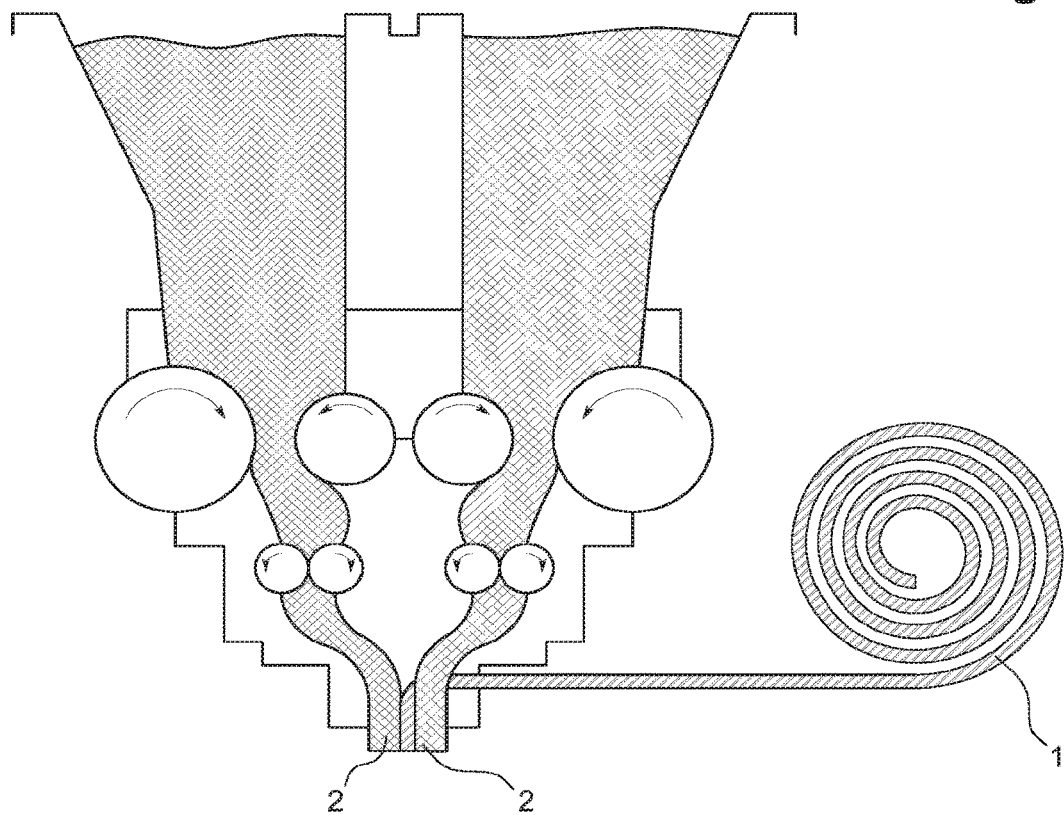
FIG. 1 represents a schematic view of the extruders upstream of the co-extrusion die for implementing the method according to the invention.

The present invention relates to a method for manufacturing external components for horology or jewellery by co-extrusion coating a substrate. 'External components' means, in particular, the bracelet, watch case and its constituent elements, the bezel or the dial. This method is more particularly described here for the manufacture of bracelets. The method consists in coating a substrate having a complex decoration and/or a texture with bands of synthetic materials. FIG. 1 schematically illustrates the method with the reel of decorative band forming substrate 1 respectively co-extrusion coated on each face with a synthetic material 2. According to the invention, the coating facing the decoration is at least partly transparent or translucent so that the patterns of the decoration can be seen.

The decorative band is formed of any flexible substrate capable of withstanding high temperatures of around 200° C. for a few seconds. It typically has a thickness comprised between 50 μm and 2 mm et preferably between 100 and 500 μm.

The pattern can be uniform all along the band. For example, the decorative band may be a natural or synthetic textile band (non-woven, unidirectional, woven, braided, knitted) made, in particular, of the following materials: linen, cotton, hemp, wool, polyester, polyamide-polyurethane. The decorative band may also be a be a strip of photo paper, a metal sheet, an adhesive band integrating mineral particles such as sand, organic particles such as wood fibres, vegetable matter or metal particles such as gold leaf. The decorative band can also be a band of thermoplastic elastomer such as: a band of TPU, TPI, TPE-O (thermoplastic olefin), TPE-S (styrenic thermoplastic elastomer), TPE-E (thermoplastic copolyester), TPE-A (thermoplastic copolyamide) or TPE-V and TPSi-V (combination of thermoplastic and cross-linked silicone). The decorative band can also be a band of PVC, PET, certain types of polycarbonate or PC, natural or synthetic rubber. The band can be used untreated and, in such case, the decoration is provided by the actual material with its natural fibre appearance, its metallic shine, etc. The band can also be decorated by conventional printing methods, such as, for example, pad printing, silk printing, offset printing, flexography, digital printing. In particular, printing on a substrate can make it possible to integrate within the decoration coloured pigments, compounds having fluorescent, phosphorescent, thermochromic or photochromic properties. The band can also be decorated by in line etching processes of the calendering type. From an industrial point of view, this method is well suited to the manufacture of bracelet collections. Within the same collection, the bracelets have an identical design and the manufacture of a new collection entails simply changing the reel of decorative band.

Figure 2:
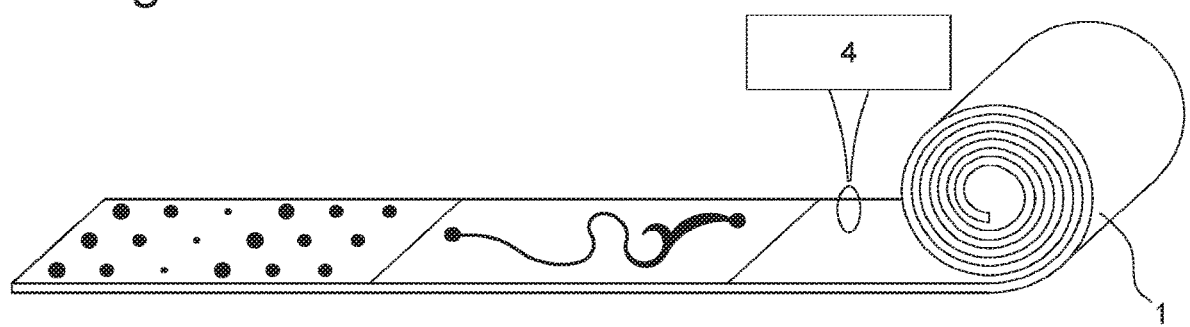
FIG. 2 illustrates the method for printing sequences of different patterns on a blank band. The band thus decorated is used as substrate in the co-extrusion coating method according to the invention.

According to a variant of the invention, the pattern is printed on demand on the blank substrate band. Several sequences of different patterns can thus be printed and/or etched one after the other on the same band 1, as illustrated in FIG. 2. The printing is preferably performed by digital printing to allow greater flexibility. In this case, the bands made of thermoplastic elastomer (TPE-O, TPU, TPI, TPE-S, TPSi-v, TPE-v), of rubber, of PET, synthetic or natural textile bands, (in particular synthetic leathers) etc. are particularly suitable. From an industrial point of view, this mass production method is particularly suitable for the manufacture of customized bracelets. The client chooses his or her design (drawing, personal photo, etc.) and, possibly the type of substrate, online or in store, the design, preferably in the form of a digital file, is processed to fit the dimensions of the substrate, then the 2D or 3D pattern is printed by digital printing on a portion of blank substrate band whose length corresponds to the width or to the length of a bracelet strand.

Next, once the decorative band is entirely printed with the various sequences of patterns chosen by the clients, it is coated with the two bands of synthetic material. The multi-layered extrudate thus formed is cut by water jet, laser, digital knife (for example with machines offered by the manufacturer Zünd) or by a stamping process to produce a customized bracelet.

The plastic coating bands according to the invention are intended to protect the decorative band from external damage and to provide a particular aesthetic and/or visual appearance, for example the plastic coating bands can be arranged to have a magnifying effect or another similar optical effect. There is an inner coating band intended to be in contact with the skin and an outer coating band positioned on the opposite face of the substrate. Typically, these bands have a thickness comprised between 100 μm and 2 mm, and preferably between 100 μm and 1 mm.

The outer plastic coating band is at least partially transparent or translucent with a transmission index of more than 60% according to the standard ASTM D-1003 in order to reveal the pattern of the decorative band. Several configurations can be envisaged. In a first variant, the outer band is entirely transparent or translucent and consequently reveals the pattern over the entire surface. In a second variant, the outer coating band is obtained by coextrusion of mixtures of materials of different colours or refractive indices, with at least one of the mixtures being transparent to reveal the pattern of the decorative band. It is therefore possible, for example, to make different coloured lines across the width of the extrudate, while maintaining a transparent or translucent area. This configuration makes it possible to obtain different effects of depth between the edges and the centre of the bracelet.

The inner plastic coating band is chosen to provide comfort to the client. It has a hardness comprised between 55 and 90 Shore A and can contain additives to improve comfort. For example, it can contain ceramics of the hexagonal boron nitride type to remove heat energy and decrease perspiration. It may also contain textile fibres having a capillary effect to wick away sweat, or aluminium salts to limit perspiration. It may also contain antibacterial agents such as particles of silver or zinc pyrithione for an anti-odour effect. Like the outer band, it can be obtained by co-extruding plastic mixtures of different colours or different refractive indices to offer different optical effects between the edges and the centre of the bracelet. Likewise, the present invention does not preclude the inner band also being at least partly transparent or translucent.

According to the invention, the synthetic materials used in the co-extrusion coating are mixtures containing at least one elastomer. The preferred elastomers are thermoplastic elastomers, silicones, rubbers and fluorinated elastomers.

More precisely, for the outer band, the elastomers are preferably chosen from the following list:
TPE-O—Thermoplastic olefin
TPE-S—More particularly, the styrene compounds SBS, SEBS or SEPS
TPE-E—Copolyester compound
TPE-U—Thermoplastic polyurethane
TPE-A—Thermoplastic polyamide
Ionomer resins
Silicones and preferably MVQ (methyl vinyl silicone rubber)
Fluorinated elastomers: FKM.

More precisely, for the inner band, the elastomers are preferably chosen from the following list:

TPE-O—Thermoplastic olefin

TPE-S—More particularly, the styrene compounds SBS, SEBS or SEPS

TPE-V—More particularly the compounds PP/EPDM or TPSiV (combination of thermoplastic and crosslinked silicone)

TPE-E—Copolyester compound

TPE-U—Thermoplastic polyurethane

TPE-A—Thermoplastic copolyamide

Ionomer resins

Silicones and preferably MVQ (methyl vinyl silicone rubber)

Fluorinated elastomers: FKM.

Preferably, the synthetic materials for the inner band and the outer band are chemically compatible and preferably the same to ensure good cohesion of the bracelet.

Depending upon the elastomer selected for its specific properties, the mixture could be supplemented by various fillers and additives desired to improve client comfort.

Figure 4:
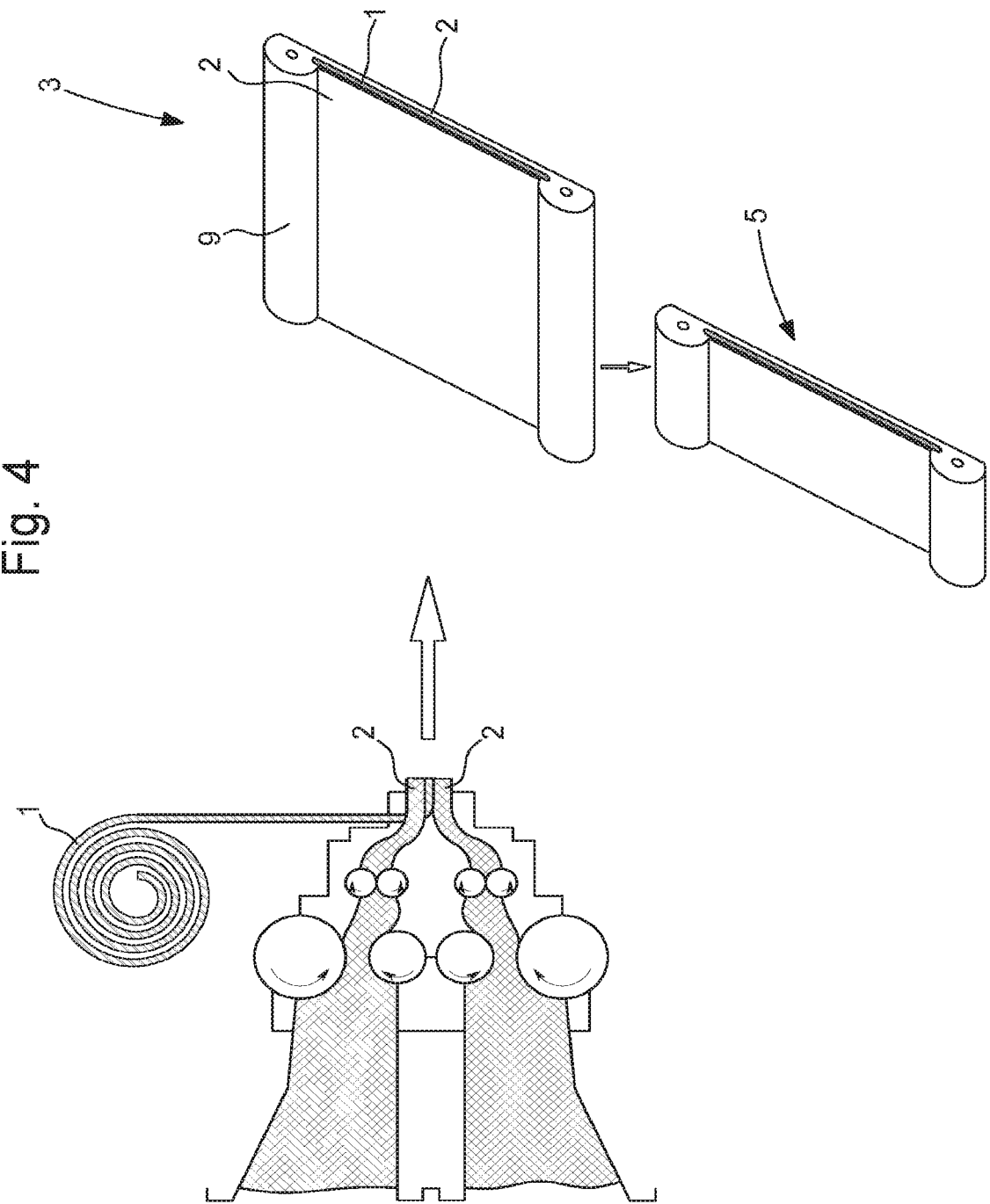
In FIG. 4, another variant is presented wherein the bracelet is co-extruded in the transverse direction of the bracelet. The extrudate is also represented after the cutting operation. At its lateral ends, the extrudate has hollow tubular structures useful for the subsequent attachment of the bracelet to the case.
Figure 5:
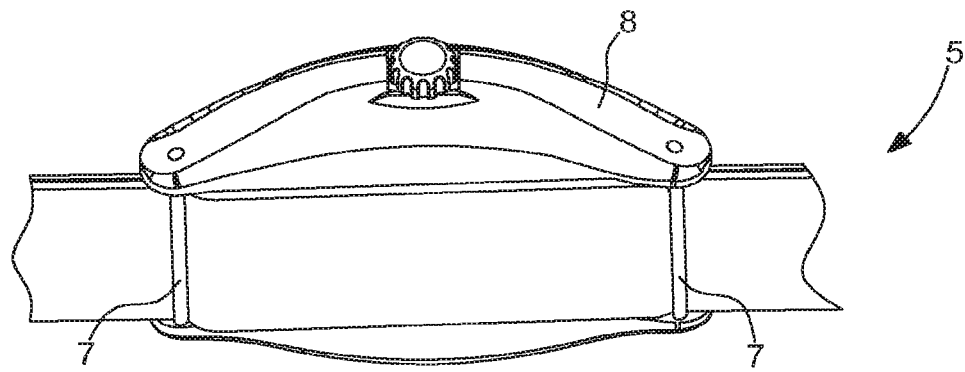
FIG. 5 represents a partial, perspective view of a watch with a bracelet obtained by the method of the invention and fixed to the case with a NATO type design.

The co-extrusion coating method can consist in manufacturing a multi-layered extrudate 3 having a width corresponding to the bracelet width as represented in FIG. 3. Advantageously, substrate 1 has a smaller width than that of upper and lower bands 2 so that its side edges are entirely covered by the synthetic bands. The co-extrusion coating method can also consist in manufacturing a multi-layered extrudate 3 having a width corresponding to the length of one strand or of both strands of the bracelet, as represented in FIG. 4. Likewise, the side edges of the substrate are entirely coated with the synthetic material. According to the embodiment of FIG. 3, the shape of bracelet 5 and the desired holes 6 are obtained by stamping, laser cutting, digital knife cutting or water jet cutting. The multi-layered extrudate obtained after co-extrusion may be in one piece and attached to watch case 8 by means of loops 7 disposed on each side of the watch case; this is the so-called NATO design illustrated in FIG. 5. According to the embodiment of FIG. 4, in order to facilitate subsequent assembly of the bracelet to the watch case, it is advantageous to make a multi-layered extrudate 3 comprising at its lateral ends a protruding hollow tubular structure 9 intended to receive a bar respectively for attachment to a watch case with horns and with a buckle, the width required for the bracelet being obtained previously by laser cutting, digital knife cutting, water jet cutting or stamping. It is also possible to envisage making a multi-layered extrudate that integrates across its width the profile of the case surrounded by the bracelet strands. The recess for the case can be formed subsequently by stamping.

Figure 6:
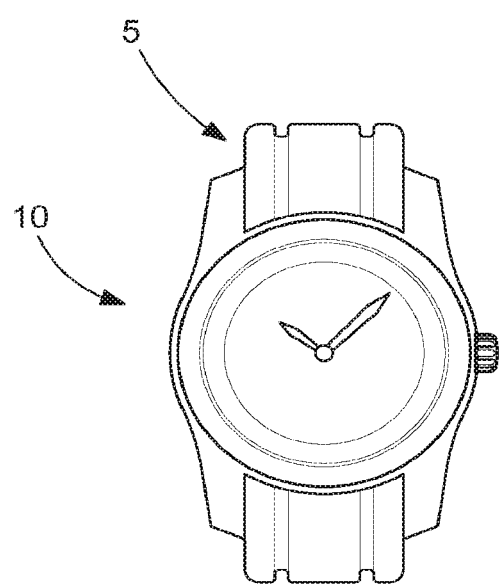
FIG. 6 represents a perspective view of a watch with a bracelet made according to the co-extrusion method of the invention. The upper band of the bracelet has raised areas separated by hollows. Although not illustrated, the upper band is transparent or translucent in order to show the decoration of the central band.

It will also be noted that the co-extrusion die may have an original profile for extruding coating bands with protruding areas or, more generally, having a particular embossed design. FIG. 6 illustrates, for example, the profile that could be obtained for the outer band of the bracelet. It is also possible, without departing from the scope of the invention, to enjoy further advantages of the extrusion method, such as combining several materials to locally change the mechanical properties of the bracelet, particularly as regards the attachment means, for example.

Bracelets made in this manner by co-extrusion have numerous advantages.

The method according to the invention is an inexpensive mass production method which makes it possible to obtain customized bracelets with a design chosen by the client, or a unique bracelet. This is therefore different from piece-by-piece moulding methods which are unsuitable for mass production with high production rates.

Very different designs can be obtained without changing the production line.

The bracelets have a particularly aesthetic appearance with an effect of depth and a three-dimensional effect produced by the thick, transparent layer of synthetic material.

The complex pattern is located inside the bracelet. It is therefore protected from external damage (mechanical wear, chemical damage, UV . . . ) by the synthetic band. The pattern is printed on a flat substrate and not on a three-dimensional bracelet, which also greatly simplifies the printing process.

Unlike the injection moulding process, the method according to the invention allows the decorative band to be precisely positioned within the synthetic material.

The nature of the decorative band can be chosen to ensure good adhesion of the ink independently of the basic formulation of the bracelet.

Moreover, the cohesion of the bracelet is ensured by the adhesion between the upper band and the lower band without having to worry about the properties of adherence between the decorative band and the coating bands. These features make it possible to integrate any type of medium within the external component, including textiles.

LIST OF PARTS (1) Substrate, also called decorative band
(2) Outer band and inner band
(3) Extrudate
(4) Printer
(5) Bracelet or strap
(6) Hole
(7) Loop
(8) Case
(9) Hollow tubular structure
(10) Watch

The invention claimed is:

1. A method of manufacturing an external component for watches or jewelry, comprising:
providing a substrate including a first face opposite to a second face; and
co-extrusion coating the first face and the second face of said substrate respectively with a first and a second band of synthetic material, the first band forming a transparent or translucent layer on the first face so that all or part of the substrate remains visible, the co-extrusion coating including forming a hollow tubular structure at lateral ends of the external component.

2. The method according to claim 1, further comprising, prior to the co-extrusion coating, printing and/or etching a decoration on the first face of the substrate.

3. The method according to claim 1, wherein a plurality of distinct decorations are printed and/or etched one after the other on the first face of the substrate.

4. The method according to claim 1, wherein the substrate is formed of a natural or synthetic textile band, of a strip of photo paper, of a metal band, of a thermoplastic elastomer band, of a rubber band, or of an adhesive band.

5. The method according to claim 1, wherein the substrate includes a material chosen from the list formed of linen, cotton, hemp, wool, synthetic leather, polyester, polyamide, polyurethane, thermoplastic olefin (TPE-O), thermoplastic polyimide (TPA), thermoplastic urethane (TPU), styrenic thermoplastic elastomer (TPE-S) or thermoplastic copolyester (TPE-E) or thermoplastic copolyster polyamide (TPE-A) rubber, polyvinyl chloride, and PET.

6. The method according to claim 4, wherein the adhesive band includes mineral particles, organic particles, or metal particles.

7. The method according to claim 2, wherein the printing makes it possible to integrate within the decoration colored pigments, luminescent compounds, thermochromic compounds, photochromic compounds, or a mixture thereof.

8. The method according to claim 1, wherein the substrate has a smaller width than that of the first and second bands in order to be coated by said bands in the co-extrusion coating step.

9. The method according to claim 1, wherein the co-extrusion coating that forms the first band and/or the second band includes co-extruding a plurality of mixtures of synthetic materials having different colors and/or refractive indices and/or mechanical properties.

10. The method according to claim 1, wherein the synthetic materials of the first and the second bands are chosen from among thermoplastic elastomers, silicones, rubbers, and fluorinated elastomers.

11. The method according to claim 1, wherein the synthetic material of the second band includes at least one of ceramics, textile fibers, aluminum salts, and antibacterial agents.

12. The method according to claim 1, wherein the external component for watches or jewelry is a bracelet or strap.

13. The method according to claim 12, wherein the extrudate produced by the co-extrusion coating has a width corresponding to the width of the bracelet or to a length of one or two strands of the bracelet.

14. The method according to claim 1, wherein the co-extrusion coating includes forming the first band by co-extruding mixtures of materials of different colors such that the first band includes different colored lines across a width of the first band with at least one of the different colored lines being transparent or translucent.

\* \* \* \* \*